United States Patent [19]
Ribbens

[11] Patent Number: 4,606,005
[45] Date of Patent: Aug. 12, 1986

[54] DRIVELINE CONTROL SYSTEM

[75] Inventor: William B. Ribbens, Ann Arbor, Mich.

[73] Assignee: Borg-Warner Corporation, Chicago, Ill.

[21] Appl. No.: 466,745

[22] Filed: Feb. 15, 1983

[51] Int. Cl.⁴ .............. G05D 17/02; B60K 41/04; G06F 15/20
[52] U.S. Cl. .............. 364/431.01; 73/862.36; 364/511
[58] Field of Search ........ 364/431.01, 431.08, 364/487, 511, 551, 554, 715; 307/273, 351; 73/862.36

[56] References Cited

U.S. PATENT DOCUMENTS

| | | | |
|---|---|---|---|
| 3,504,288 | 3/1970 | Ross | 307/273 X |
| 3,832,577 | 8/1974 | Harr | 307/351 |
| 4,008,567 | 2/1977 | Hirsch | 364/511 X |
| 4,044,234 | 8/1977 | Frobenius et al. | 364/431.08 |
| 4,091,379 | 5/1978 | Wu et al. | 364/487 X |
| 4,092,955 | 6/1978 | Reddy | 364/431.08 X |
| 4,100,794 | 7/1978 | Meixner | 73/862.36 |
| 4,121,121 | 10/1978 | Gabeler et al. | 307/351 |
| 4,295,099 | 11/1981 | Evans | 307/351 X |
| 4,313,341 | 2/1982 | Yamaguchi et al. | 73/862.36 |
| 4,341,964 | 7/1982 | Chi et al. | 307/351 X |
| 4,446,486 | 5/1984 | Itoh | 307/351 X |
| 4,517,648 | 5/1985 | Ina et al. | 364/508 X |

OTHER PUBLICATIONS

Ribbens: A New-Contacting Torque Sensor for the Internal Combustion Engine, S.A.E. Paper #810155.

Primary Examiner—Felix D. Gruber
Attorney, Agent, or Firm—James J. Jennings, Jr.

[57] ABSTRACT

An engine transfers torque through a transmission to a load, and the torque transfer through the system is measured. From the torque measurement maximum and minimum amplitude torque signals are taken, to provide an indication of torque non-uniformity. These signals are then used to control engine operation to avoid a rough-running condition.

11 Claims, 8 Drawing Figures

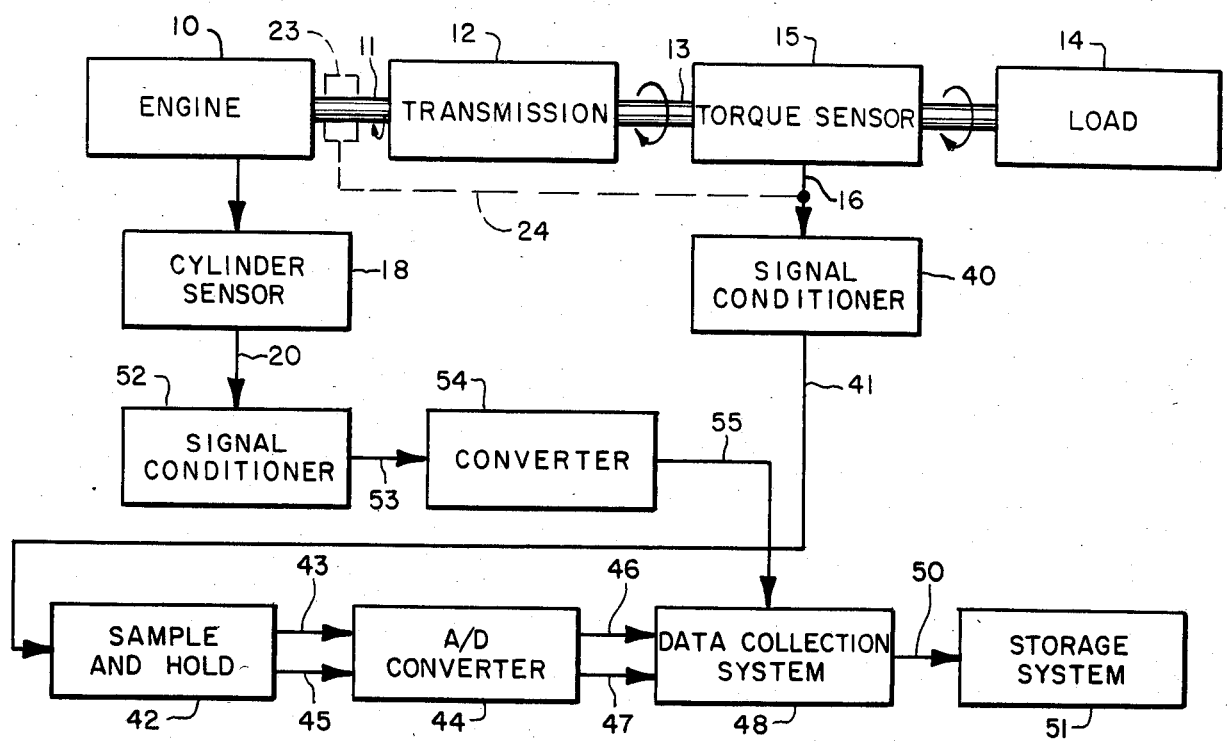
FIG. 3
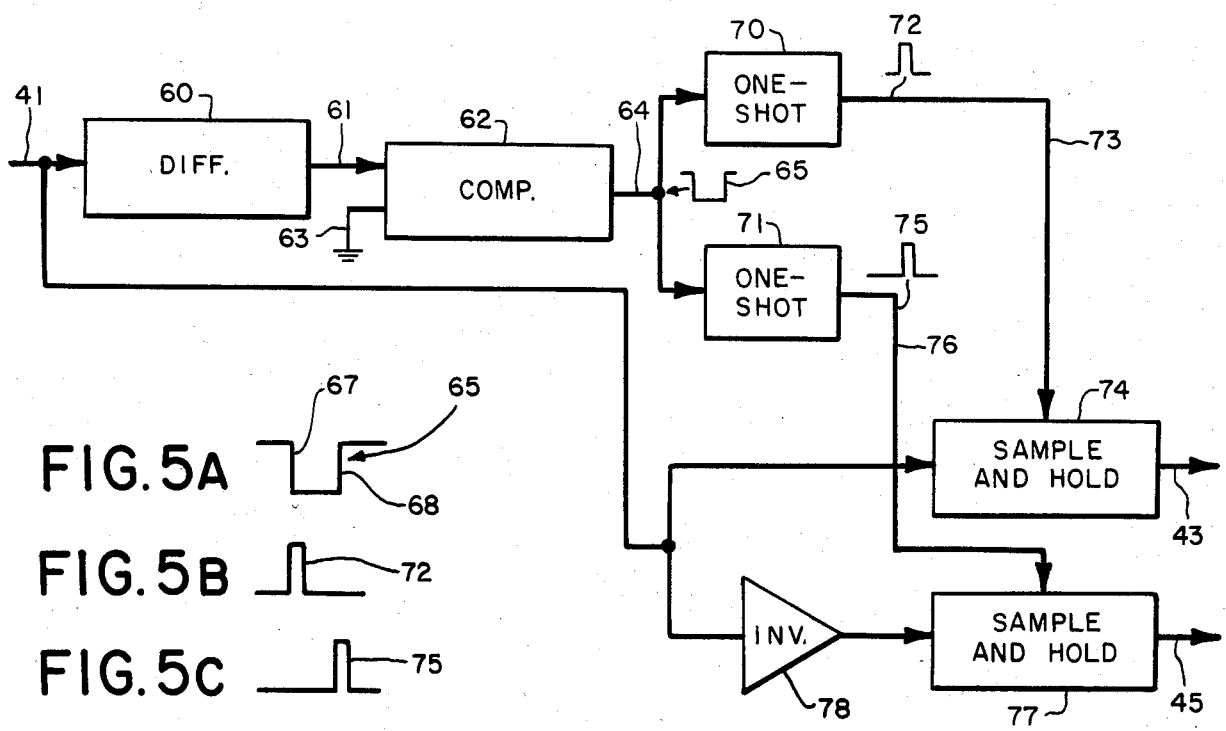
FIG. 5A
FIG. 5B
FIG. 5C
FIG. 4

DRIVELINE CONTROL SYSTEM

BACKGROUND OF THE INVENTION

In the driveline of an automotive vehicle, an engine is usually connected through a transmission to drive the wheels of the vehicle. As the vehicle velocity changes from zero to a normal cruising speed, there are attendant changes in the engine operation and the transmission ratio. For example, as the driver signals a demand for greater torque by depressing the accelerator pedal, this can open the carburetor to provide additional fuel to the engine cylinders. As the vehicle speed increases, the tranmission is generally shifted through several gear ratios until cruising speed is reached. With the increased use of electronic circuits, and especially with the advent of integrated circuits, the amount and precision of electronic control have begun to increase substantially.

To effect more precise and more efficient control of the engine and/or transmission, various sensors have been used to derive information such as engine manifold pressure, engine temperature, the temperature of the engine coolant, the angular velocity of the engine (or transmission) output shaft, the torque supplied over this output shaft, and so forth. These various data signals can then be combined in a processing arrangement which compares the actual system operation to the desired operation, and controls the engine operation to reduce the disparity between the actual and desired operating conditions. Recently it has been found that output torque can be derived by measuring the acceleration of the engine crankshaft. This provides useful data for any control system requiring an indication of the torque actually produced. In general such a torque signal has been provided by averaging the torque present in the shaft over a measuring interval.

It now appears that some system for measuring torque non-uniformity is desirable. By non-uniformity is meant the deviation of the torque from a periodic, or generally constant, value under steady state operation. While an indication of torque non-uniformity has more limited application in the United States at the present time, because of the use of stoichiometric operation and catalytic converters, the "lean burn" strategy employed for the engine control of many European vehicles can now use the indication of torque non-uniformity. The more efficient operation obtained using excess air in a lean burn system can produce excessive unburned hydrocarbons, which excess is correlated with non-uniform values of the driveline torque. Hence a signal denoting torque non-uniformity can be utilized for effective control of a lean burn engine to obtain maximum efficiency and still avoid excessive unburned hydrocarbons in the engine exhaust.

It is therefore a prime consideration of the present invention to provide an effective system for indicating non-uniformity of the driveline torque.

A corollary consideration is to provide such a system which utilizes the torque non-uniformity signal in the control of the engine, or transmission, or some other adjustable unit in the driveline.

SUMMARY OF THE INVENTION

The present invention is particularly useful to regulate the transfer of torque through a driveline, including an engine unit and a transmission unit, to a load. The control system of the invention comprises a torque sensor coupled to the engine/driveline for providing an information signal related to driveline torque or the net instantaneous torque produced by the engine. Coupled to the torque sensor is a data processor for providing a control signal which varies as a function of torque non-uniformity. A circuit means, which can be a simple electrical conductor, is coupled between the data processor and either the engine or transmission, to adjust either the engine or transmission in accordance with the control signal, thus regulating the torque delivered to the load.

In accordance with a salient aspect of the invention, the data processor includes means for deriving data denoting maximum and minimum torque values, and for processing this data to produce the control signal indicating torque non-uniformity.

THE DRAWINGS

In the several figures of the drawings, like reference numerals identify like components, and in those drawings:

FIG. 3 is a block diagram depicting a portion of a control system of this invention intercoupled with a vehicle driveline to prove the principles of this invention;

FIG. 4 is a block diagram depicting a portion of the control system of FIG. 3 in greater detail;

FIGS. 5A, 5B and 5C are simple graphical illustrations useful in understanding the operation of the system in FIG. 4.

DETAILED DESCRIPTION OF THE INVENTION

Figure 1:
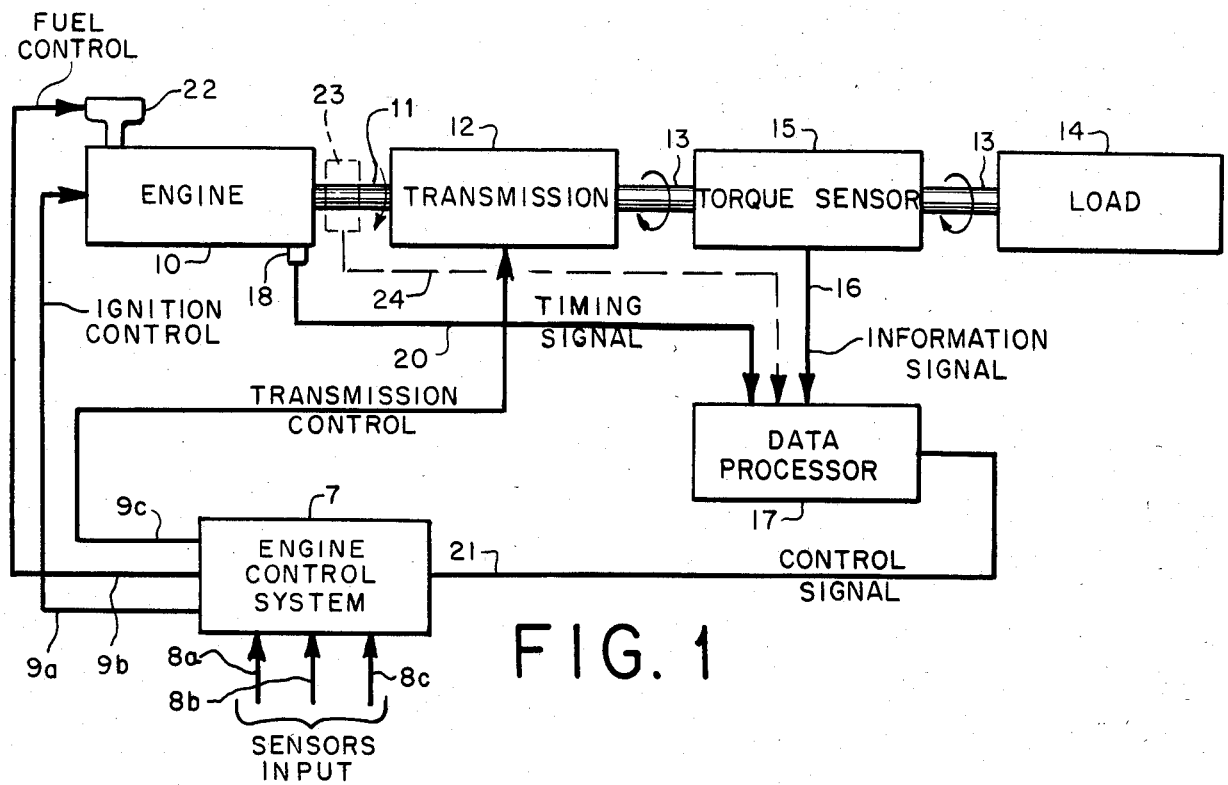
FIG. 1 is a block diagram indicating cooperation of the inventive control system with a vehicle driveline.

FIG. 1 depicts a general arrangement in which an engine 10 supplies drive torque over an output shaft 11 to a transmission 12, which in turn drives shaft 13. By way of example the load can be the vehicle final drive arrangement including a differential and drive wheels (not shown), and these components are generally referred to as load 14. A torque sensor 15 is shown mounted on shaft 13 for providing an electrical signal over line 16 to a data processor 17. However, this placement of the torque sensor is only representative of several possible locations, each of which can provide the required measure of engine or driveline instantaneous torque. The signal on line 16 is a torque information signal which varies as some known function of driveline torque, where the driveline generally includes the components from the output side of the engine to the road-engaging drive wheels. A sensor 18 is positioned on or adjacent the output side of the engine to provide a reference or timing signal on line 20 for application to the data processor. Within data processor 17 is circuit means, as will be described hereinafter, for providing on output line 21 a control signal for application to an engine-transmission control system 7, which also receives a plurality of sensor input signals over lines 8a, 8b, and 8c from various sensors (not shown). These signals may include data such as angular velocity of the engine output shaft, temperature of the fluids in the engine and/or transmission, chemical composition of the engine exhaust gases, and other suitable signals as are well-known in this art. The control system 7 operates upon these signals in accordance with pre-programmed algorithms to produce output signals on lines 9a, 9b, and 9c. The signal on 9a regulates the ignition (timing) within the cylinders of engine 10, the signal on 9b regulates fuel flow to a fuel control unit 22 of the engine, and the signal on 9c is a transmission control signal. Such control systems are now well-known and understood in this art and will not be further described herein. By changing the ignition timing and the air/fuel ratio of the mixture supplied to the cylinders of engine 10, operation of the engine is controlled as a function of the signal on line 21, thus regulating the torque delivered to load 14 as a function of the control signal on line 21. If desired, a torque sensor 23 (preferably of the non-contacting type) can be positioned on or adjacent to engine output shaft 11 to provide an information signal which varies as a known function of instantaneous indicated torque, for passage over line 24 to data processor 17. The exact point in the driveline from which the torque information signal is derived does not affect the successful operation of this invention, provided the control algorithm takes into account the characteristics of the torque being measured.

Figure 2:
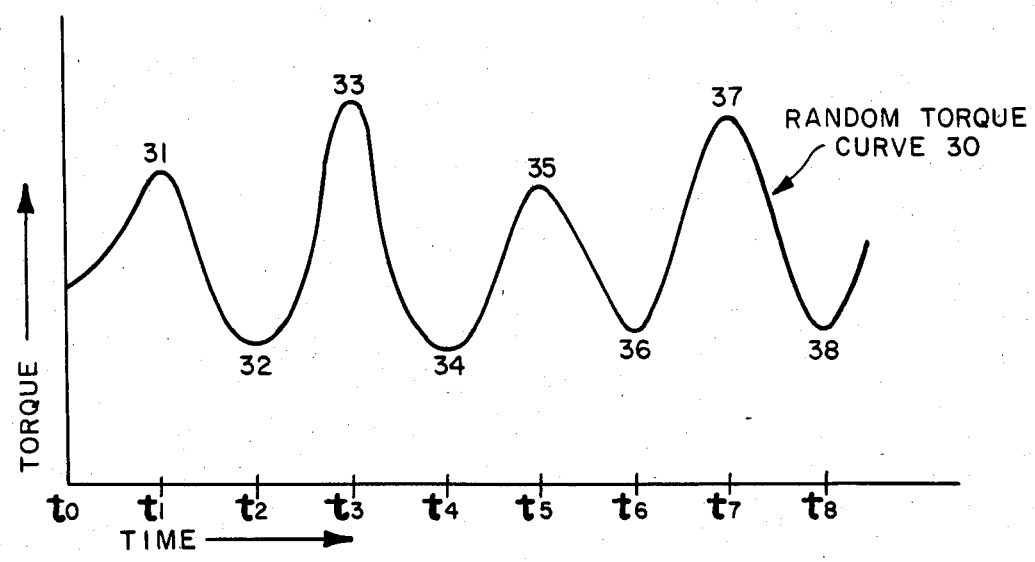
FIG. 2 is a graphical illustration useful in understanding the invention.

A significant aspect of the present invention resides in the recognition that a determination of torque non-uniformity can be made from the maximum and minimum values of the instantaneous torque value present in the driveline. As noted above, it has been known that output torque can be derived by measuring the acceleration of the engine crankshaft. FIG. 2 depicts the value of torque in such an engine crankshaft for one complete cycle of engine operation. For example, with a 4-cylinder, 4-stroke engine, 2 revolutions of the main drive shaft are provided as the four cylinders are fired in the appropriate firing sequence. The resultant torque produced in the engine output shaft 11 is represented by curve 30 in FIG. 2. The successive maximum excursions of the torque are shown at points 31, 33, 35 and 37, which occur respectively at times t1, t3, t5 and t7. Similarly the minimum torque values of the curve occur at points 32, 34, 36 and 38, at the respective times t2, t4, t6 and t8. The essential quantitative representation of the torque non-uniformity is contained in the extrema of torque. There is relatively less significant information in the waveforms connecting these extrema.

In seeking an indication of torque non-uniformity, it was appreciated that if the maximum and minimum excursions of the torque curve 30 could be measured, and these measurements retained for processing, a resultant signal denoting torque non-uniformity might be obtained. This concept was proved correct by using the system shown in FIG. 3. A 4-cylinder engine 10 was connected to drive a 5-speed transmission 12, and an electric dynamometer was utilized as load 14. For torque sensor 15, a Himmelstein model 602 T instrument was used. Of course, other types of torque sensors and indicators could be employed. One suitable torque sensor is that shown in U.S. Pat. No. 4,100,794, which issued July 18, 1978, and is assigned to the assignee of this invention. Another suitable method of torque sensing measures the instantaneous shaft speed, filters and differentiates the speed signal, and then takes a moving average of such signal over a short time duration. This method of torque sensing is described in SAE paper 810155, entitled "A Non-contacting Torque Sensor for the Internal Combustion Engine", authored by the inventor of the present invention.

A signal conditioner circuit 40 receives the torque sensor output signal, and provides an analog signal over line 41 to sample-and-hold circuit 42. In stage 42 the torque signal on line 41 is sampled at the relative maximum and minimum levels, and output signals connoting the maximum values are supplied over line 43 to an analog-to-digital (A/D) converter 44. Signals denoting the relative minimum torque values are supplied over line 45 to converter 44. The maximum value signals are passed over line 46 and the minimum value signals over line 47 to a data collection system 48, through which the signals are gated and passed over line 50 to a suitable storage system 51, which can be a set of registers, a disc drive, or any other suitable memory arrangement so that the signals can be recalled for later signal analysis.

To gate the signals through data collection system 48, it is helpful to identify which cylinder firing has produce a given relative maximum and minimum value in the sequence of torque values. Accordingly, in this embodiment sensor 18 was a sensor coupled capacitively to the spark plug in the #1 cylinder in the engine. It should be noted that alternative means for measuring crankshaft angular position might be desirable in other circumstances (e.g., in a Diesel engine this would be required). Signal conditioner 52 provides a pulse on line 53 of standard amplitude and duration each time the #1 cylinder is fired. This pulse is then converted in converter 54 to a digital pulse which is passed over line 55 to data collection system 48, for identifying the two data values (one torque maximum and one torque minimum for the #1 cylinder) in the train of maxima and minima signals passed to the storage system. The pulse on line 55 indicates the beginning of a data "block" or sequence of eight torque values, such as the values represented by points 31-38 in FIG. 2. In an operating system this data block is examined to verify the alternation of four maximum and four minimum torque values, for a 4-cylinder engine. Thus one data block is generated, in this embodiment, as the crankshaft completes two full revolutions and each cylinder fires once. Of course, the sequence would be different if a different number of cylinders were employed. Moreover, the sequence would be correspndingly different in a two stroke/cycle engine. If the desired sequence is not verified in data collection system 48, then the information contained in that data block is rejected and not utilized for driveline control.

The block arrangement of FIG. 4 shows, in a generalized form, the circuit arrangement for deriving the relative maximum and minimum values of the torque. Maxima and minima can be detected by determining the instants at which the time derivative of torque are zero. At relative maxima the second derivative is negative, and at relative minima the second derivative is positive. These time instants can be determined electronically as follows. After being conditioned by band-pass filtering in signal conditioner 40 of FIG. 3, the analog signal on line 41 represents torque in the driveline. The torque signal is differentiated with respect to time in an analog differentiation stage 60, and passed over line 61 to one input of a fast comparator stage 62, the other input of which is coupled over line 63 to a plane of reference potential. Comparator 62 provides on its output line 64 a signal 65, as shown in FIG. 5A, which switches state whenever the gradient of the analog torque signal changes polarity. Thus the negative going portion 67 of the comparator output occurs at each relative maximum value of the torque, and the positive-going transition 68 occurs at each relative minimum value of the torque.

A pair of monostable multivibrator circuits 70 and 71 are connected to receive the output signal 65 from comparator 72. One-shot 70 generates a pulse 72 (FIG. 5B) of short duration with each negative-going transition of signal 65, that is, at each torque maximum value. This pulse is applied over line 73 to a first sample-and-hold stage 74. The one-shot multivibrator stage 71 generates a short duration pulse 75 when signal 65 goes positive, at each torque minimum value. This pulse is passed over line 76 to another sample-and-hold circuit 77. The analog torque signal from line 41 is always presented at the input of circuit 74 and, after passing through an inverter stage 78, at the input of circuit 77. The reversal of sign (by stage 78) of the torque minima signals results in a larger dynamic range of A/D converter 44, and hence greater accuracy. Thus each gating pulse on line 73, produced at the times of torque maximum values, gates stage 74 to pass these torque maxima signals over line 43. Likewise the pulses 75 gate stage 77 at the torque minima times to produce the inverted minimum torque value signals on line 45. As previously described, the timing pulses derived from sensor 18 are used to identify a reference point in each block of data signals for processing in system 48 and storage in the registers, disc drive, or any other memory arrangement.

The generation of the non-uniformity signal is a numerical operation which is performed in the data processor. The signal which is generated at any time is based upon the torque maxima and minima data which was obtained and stored in memory for the preceding K (integer) engine cycles. In essence this composition involves averaging the non-uniformity quantity which is computed for each cycle over K cycles. The choice of K depends upon the particular engine control application.

There are many potential metrics for torque non-uniformity which can be computed from the relative maxima and minima data. However, there are two which have been found to correlate well with observed non-uniformity. These can perhaps best be described with the aid of mathematics and with reference to FIG. 2.

Consider the kth engine cycle (i.e., consisting of 2 complete revolutions). For an N cylinder engine there will be N relative maxima and N relative minima of torque. The relative maxima of torque for the kth cycle are ordered with superscripts n as follows.

$T^n(k) = n$th relative maximum $n = 1, 2 \ldots N$ $T_n(k) = n$th relative minimum It is convenient to define a 2N dimensional vector $T(k)$ having components $T'(k) = [T^1(k), T_1(k), T^2(k) \ldots T_N(k)]$ where the prime indicates transpose. The non-uniformity information signal or metric is derived from manipulations of this vector. The corresponding computations are readily performed by a digital computer.

The mean value of the torque per cycle is denoted $T(k)$ and is given by the $l_1$ norm $$\overline{T}(k) = \frac{1}{2N} \, ||T(k)||_1$$

$$= \frac{1}{2N} \sum_{n=1}^{N} [|T^n(k)| + |T_n(k)|]$$

From this quantity a torque deviation vector which is denoted $\tau(k)$ is defined $$\tau(k) = T(k) - \overline{T}(k)u$$

where u is a 2N dimensional unit column vector. The components of the vector $\tau(k)$ represent the deviation of the N relative maxima and N relative minima from the cycle average $\overline{T}(k)$.

Next a non-uniformity vector n(k) is defined which is also $1 \times 2N$:

$$\underline{n}(k) = \underline{\tau}(k) - \frac{e||\tau(k)||_1}{2N}$$

where e is a $1 \times 2N$ vector $$e' = [1, -1, \ldots 1, -1]$$

The two actual non-uniformity metrics which are computed per cycle are the $l_1$ and $l_2$ norms for n(k):

$$n_1(k) = ||n(k)||_1$$

$$n_2(k) = ||n(k)||_2$$

The desired non-uniformity information signals $n_1$ or $n_2$ are obtained by averaging over K cycles:

$$n_1 = \frac{1}{K} \sum_{k=1}^{K} n_1(k)$$

$$n_2 = \frac{1}{K} \sum_{k=1}^{K} n_2(k)$$

Figure 6:
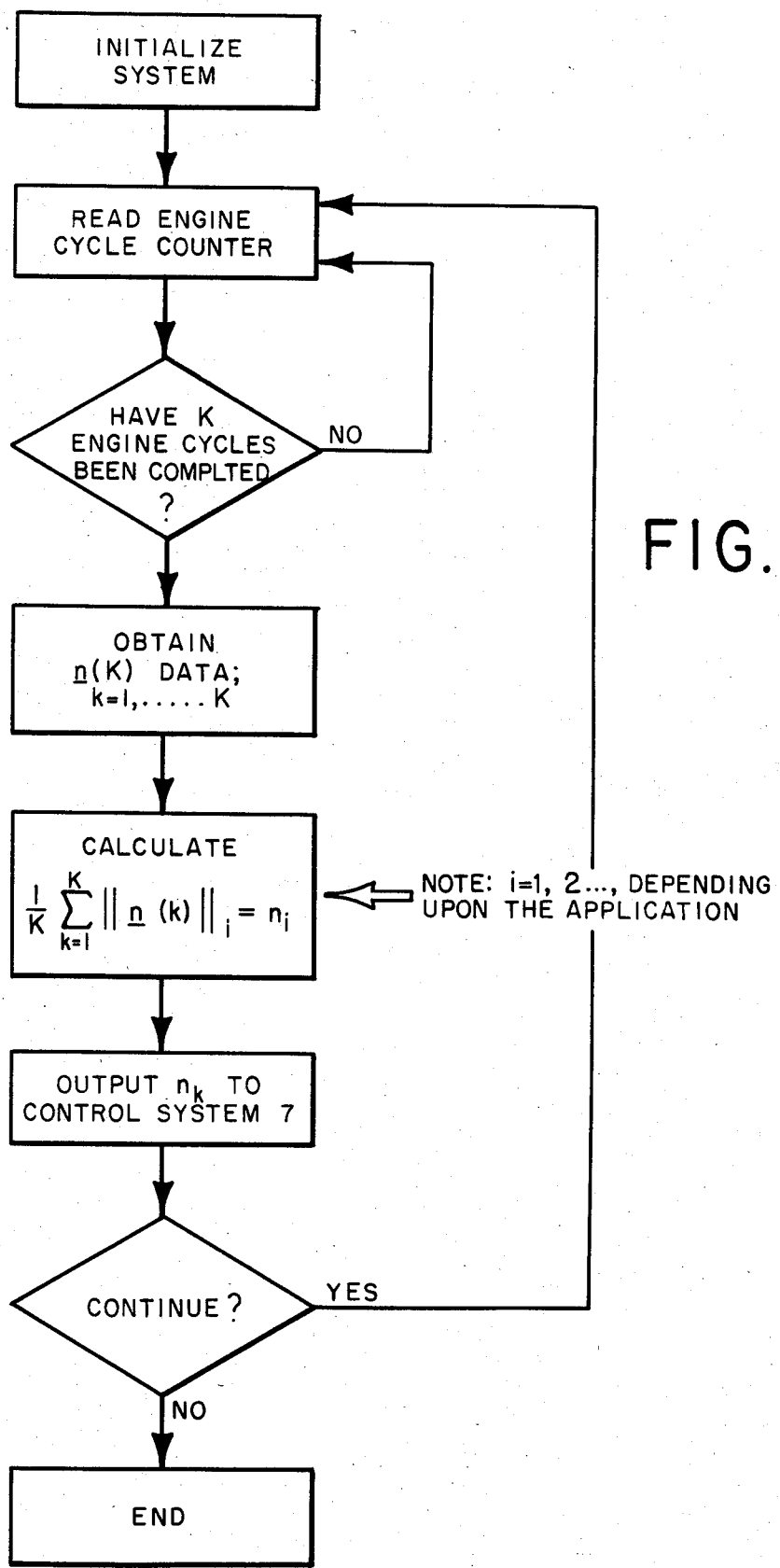
FIG. 6 is a flow chart useful in understanding implementation of the invention.

A flow graph for this signal processing operation is given in FIG. 6.

The system shown in FIG. 3 provided data which demonstrated the effectiveness of the invention. It was found that the use of amplitude maxima and minima values provided an accurate measurement of torque non-uniformity, which measurement was scalar, was zero when the torque was maximally uniform, and which increased monotonically when the torque deviated from its maximal uniformity. A monotonic function is one on which the slope has only one polarity over the domain. Thus y is a monotonic function of x if dy/dx is either non-negative or non-positive over the entire domain. The measurement results (that is, $n_1$, $n_2$) of the invention correlated well with the prediction errors in a second order auto-regression analysis, for a variety of engine operating conditions. Thus it has been found that measurement of torque amplitude maxima and minima provides an excellent description of the cycle-to-cycle variation, as well as the cylinder-to-cylinder variation, in the torque of an internal combustion engine.

In the appended claims the term "connected" means a connection between two components such that an electrical current can flow between those components. The term "coupled" indicates there is a functional relationship between two components, with the possible interposition of other components and/or elements (including air) between the two components or elements described as "coupled" or "intercoupled".

While only a particular embodiment of the invention has been described and claimed herein, it is apparent that various modifications or alterations of the invention may be made. It is therefore the intention in the appended claims to cover all such modifications and alterations as may fall within the true spirit and scope of the invention.

What is claimed is:

1. In a system for regulating torque transfer through a driveline to a load, which driveline includes an engine unit and a transmission unit, at least one of which units is adjustable to vary the torque transferred to the load, a control system comprising:

torque sensing means coupled to the driveline to provide a torque information signal related to a component of driveline torque, for example, indicated torque;

signal processing means, coupled to the torque sensor, for providing a control signal which varies as a function of torque non-uniformity; and circuit means, coupled between said signal processing means and at least one of the engine and transmission units, for regulating the extent of torque non-uniformity as a function of said control signal.

2. In a system for regulating torque transfer through a driveline to a load, which driveline includes an engine unit and a transmission unit, at least one of which units is adjustable to vary the torque transferred to the load, a control system comprising:

torque sensing means coupled to the driveline to provide a torque information signal related to a component of driveline torque, for example, indicated torque;

signal processing means, coupled to the torque sensor, for providing a control signal which varies as a function of torque non-uniformity, including circuit means for providing signals denoting the maximum and minimum amplitudes of the torque information signal, and means for using the torque amplitude signals in providing the control signal; and additional circuit means, coupled between said signal processing means and at least one of the engine and transmission units, for regulating the extent of torque non-uniformity as a function of said control signal.

3. In a system for regulating torque transfer through a driveline to a load, which driveline includes an engine unit and a transmission unit, at least one of which units is adjustable to vary the torque transferred to the load, a control system comprising:

torque sensing means coupled to the driveline to provide a torque information signal related to a component of driveline torque, for example, indicated torque;

signal processing means, coupled to the torque sensor, for providing a control signal which varies as a function of torque non-uniformity;

a differentiator connected to differentiate the torque information signal, a comparator coupled to the differentiator for producing a square wave signal, a pair of monostable multivibrator circuits coupled to the comparator for producing respective pulses, at the positive-going and negative-going portions of the square wave signal, means, including a pair of sample-and-hold circuits both connected to receive the torque information signal and each coupled to one of the monostable multibrator circuits, for providing signals denoting the maximum and minimum amplitudes of the torque information signal, and means for using the torque amplitude signals in providing the control signal; and circuit means, coupled between said signal processing means and at least one of the engine and transmission units, for regulating the extent of torque non-uniformity as a function of said control signal.

4. In a system for regulating operation of an engine which drives a load, which engine is adjustable in its operation, a control system comprising:

a torque sensor connected to provide a torque information signal related to engine torque output;

signal processing means, coupled to the torque sensor, for providing a control signal which varies as a function of torque non-uniformity; and circuit means, coupled between said signal processing means and the engine, for regulating engine operation as a function of said control signal.

5. In a system for regulating operation of an engine for transferring torque to a load, a control system comprising:

torque sensing means connected to provide a torque information signal related to the torque developed by the engine;

signal processing means, coupled to the torque sensing means, for providing a control signal which varies as a function of torque non-uniformity; and an engine control module, connected to receive a plurality of information input signals and said control signal, for developing an output signal for controlling operation of the engine.

6. In a system for regulating operation of an engine for transferring torque to a load, a control system comprising:

torque sensing means connected to provide a torque information signal related to the torque developed by the engine;

signal processing means, coupled to the torque sensing means, for providing a control signal which varies as a function of torque non-uniformity, including circuit means for providing signals denoting the maximum and minimum amplitudes of the torque information signal, and means for using the torque amplitude signals in providing the control signal; and an engine control module, connected to receive a plurality of information input signals and said control signal, for developing an output signal for controlling operation of the engine.

7. In a system for regulating operation of an engine for transferring torque to a load, a control system comprising:

torque sensing means connected to provide a torque information signal related to the torque developed by the engine;

signal processing means, coupled to the torque sensing means, for providing a control signal which varies as a function of torque non-uniformity;

a differentiator connected to differentiate the torque information signal, a comparator coupled to the differentiator for producing a square wave signal, a pair of monostable multivibrator circuits coupled to the comparator for producing respective pulses, at the positive-going and negative-going portions of the square wave signals, means, including a pair of sample-and-hold circuits, both connected to receive the torque information signal and each coupled to one of the monostable multivibrator circuits, for providing signals denoting the maximum and minimum amplitudes of the torque information signal, and means for using the torque amplitude signals in providing the control signal; and an engine control module, connected to receive a plurality of information input signals and said control signal, for developing an output signal for controlling operation of the engine.

8. A signal processing system including a sensor connected to provide a torque information signal, a plurality of signal processing stages intercoupled to operate upon the torque information signal and produce successive blocks of data denoting torque maximum values and torque minimum values, and further to derive a resultant signal which is a measure of torque non-uniformity, which resultant signal has the properties of being a scalar, being normalized to zero when two conditions, all maximum values being equal and all minimum values being equal, are satisfied, and which resultant signal increases monotonically with greater torque non-uniformity, and means for utilizing said resultant signal.

9. A signal processing system as claimed in claim 8, which system utilizes the minimum number of data blocks to provide an effective indication of torque non-uniformity, thus achieving operation with minimum signal delay.

10. For use in regulating an automotive engine which provides torque to a driveline, the method comprising the steps of:
sensing the instantaneous torque level at a point in the driveline, and providing a torque information signal related to the sensed instantaneous torque level;
operating upon the torque information signal to derive a first series of output signals connoting the maximum values of the torque information signal and a second series of output signals connoting the minimum values of the torque information signal;
using the first and second series of output signals to derive a torque non-uniformity signal; and
using the torque non-uniformity signal in the control of the automotive engine.

11. The method claimed in claim 10, in which the times at which the relative maximum and minimum values of the torque information signal occur are determined by differentiating the torque information signal with respect to time, and comparing the differentiated signal to a reference signal to produce a timing control signal which switches state whenever the gradient of the torque information signal changes polarity.

* * * * *